(12) United States Patent
Vienney

(10) Patent No.: US 7,932,625 B2
(45) Date of Patent: Apr. 26, 2011

(54) GROUND-LEVEL POWER SUPPLY CIRCUIT, ESPECIALLY FOR A TRAMWAY

(75) Inventor: Jean-Pierre Vienney, Paris (FR)

(73) Assignee: Alstom Transport SA, Levallois-Perret (FR)

( * ) Notice: Subject to any disclaimer, the term of this patent is extended or adjusted under 35 U.S.C. 154(b) by 196 days.

(21) Appl. No.: 12/367,223

(22) Filed: Feb. 6, 2009

(65) Prior Publication Data

US 2009/0251006 A1    Oct. 8, 2009

(30) Foreign Application Priority Data

Feb. 6, 2008    (FR) ...................................... 08 50750

(51) Int. Cl.
*B60L 1/00*    (2006.01)
(52) U.S. Cl. ......................................................... 307/9.1
(58) Field of Classification Search ................... 307/9.1
See application file for complete search history.

(56) References Cited

U.S. PATENT DOCUMENTS

| 6,382,378 | B1 * | 5/2002 | Cornic ............................ 191/6 |
| 7,258,309 | B2 | 8/2007 | Ehrsam et al. |

FOREIGN PATENT DOCUMENTS

| DE | 301503 | 4/1915 |
| DE | 4329935 | 3/1995 |
| EP | 1 043 186 A1 | 10/2000 |
| JP | 2002165301 | 6/2002 |
| WO | 02/096737 A1 | 12/2002 |

* cited by examiner

*Primary Examiner* — Robert L. DeBeradinis
(74) *Attorney, Agent, or Firm* — Davidson, Davidson & Kappel, LLC

(57) ABSTRACT

The ground-level power supply circuit includes two running ways each having a power supply track which includes a series of conducting track segments separated by insulated joints, and a power supply line. The power supply line is common to the two power supply tracks, and the power supply circuit includes switching devices for independently and selectively connecting the power supply track segments to the common power supply line.

10 Claims, 1 Drawing Sheet

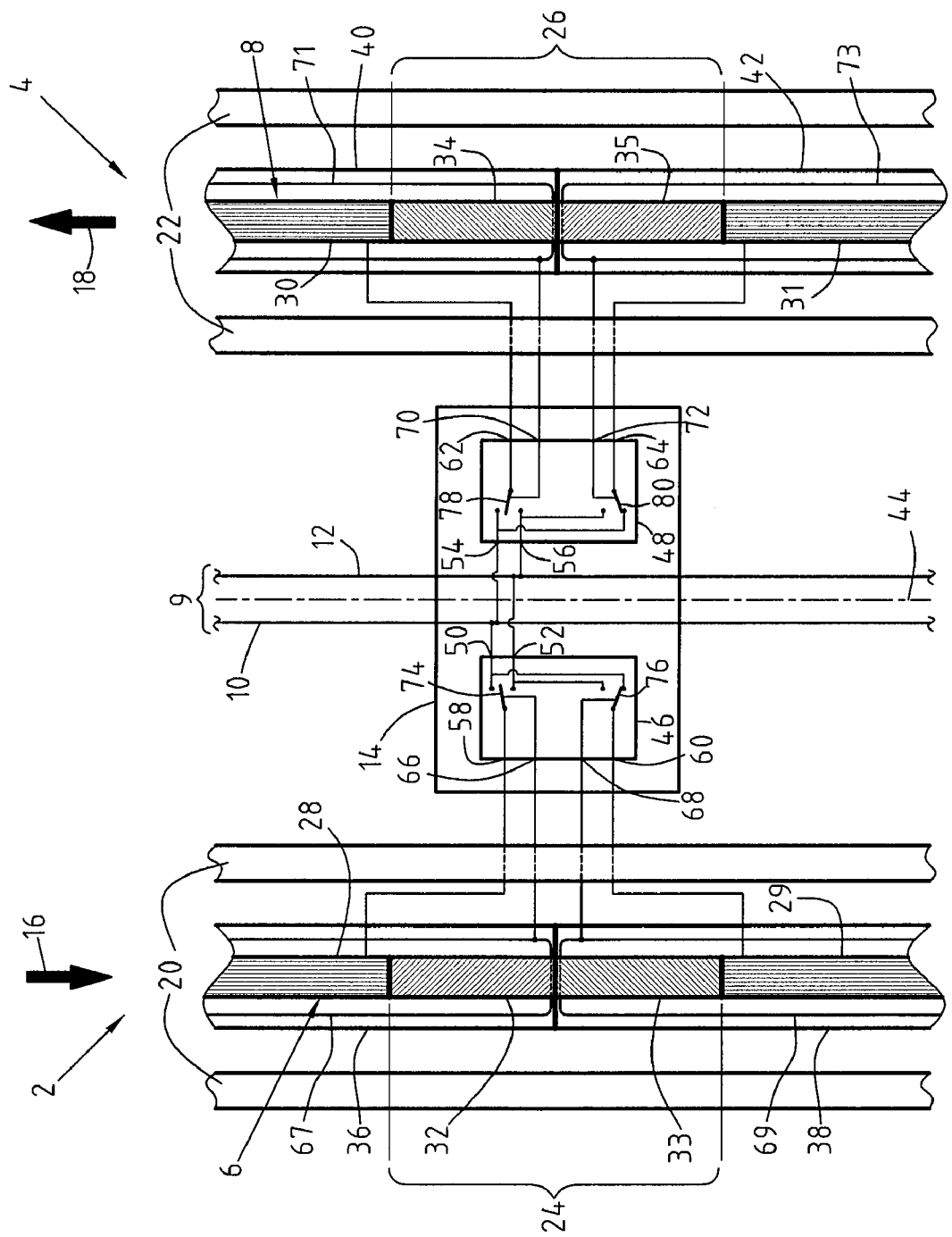

ID-LEVEL POWER SUPPLY CIRCUIT, ESPECIALLY FOR A TRAMWAY

Priority is claimed to French Patent Application No. 08 50750 filed on Feb. 6, 2008 which is hereby incorporated by reference herein.

The invention relates to a ground-level power supply circuit for a transport system, especially of the tramway type.

BACKGROUND OF THE INVENTION

There exist ground-level supply circuits which enable vehicles of the tramway type to capture, by means of a friction shoe, the electrical traction energy they require for their movement and to free themselves of overhead lines, which are not very aesthetic, in particular in the region of junctions.

Such a circuit is described in patent application EP 1 043 186 A1. The described circuit comprises, for each running way a power supply assembly which comprises a series of conducting and contact track segments or sections which are insulated from one another by insulated joints and are at least partially exposed. The power supply assembly also comprises an electric line, which is to be permanently supplied with power, means suitable for selectively connecting the track segments to the electric line, and support segments which are made of insulating material and each have the general form of an "I"-shaped profile.

Furthermore, the core of the support segments is provided with interior passages which permit the passage of the electric line, which is in the form of cables subjected, for example, to voltages of 750 volts and 0 V, and the supply of power to the power supply track, which is formed by the series of conducting segments separated by insulated joints.

Switch housings to which the 750 volt and 0 volt cables lead are arranged between two conducting track segments and permit selective connection to the 750 volt power supply line or to the line for setting to 0 volts.

An identical configuration is employed on the adjacent running way described above by passing a second 750 volt line and a second line set to 0 volts along and inside the series of support segments of the power supply track of the adjacent rail.

Such an arrangement results in a high power supply resistance, which is reduced by making the 750 volt lines of the two adjacent tracks equipotential.

There results the installation of ports and sleeves specific to the making of the two power supply tracks equipotential.

The technical problem is to be able to avoid the installation of ports and sleeves specific to power supply equipotential.

SUMMARY OF THE INVENTION

The present invention provides a ground-level power supply circuit for a transport vehicle, especially of the tramway type, including
two mutually parallel vehicle running ways, each having a power supply track which includes a series of conducting track segments separated by insulated joints;
a power supply line which can be connected to terminals of a power supply source, characterized in that
the power supply line is common to the two power supply tracks and comprises switching means for independently and selectively connecting the power supply track segments to the common power supply line.

According to additional particular embodiments, the power supply circuit may include one or more of the following features:

the common power supply line is arranged between the two power supply tracks;
the common power supply line comprises a power supply cable and a current return cable;
the power supply cable and the current return cable each comprise electric cables encased in a sleeve;
the switching means comprise an assembly of simple switches having two inputs and one output, one switch being located at the level of each insulated joint of a track and being connected to a conducting segment of the track;
the insulated joints of the two tracks are located at the same level along the power supply line, and the simple switches located at the same level are integrated into a connection assembly;
the switching means comprise an assembly of switching modules, the switching modules comprising two two input-one output switches and being located only at the level of one insulated joint out of two along a track, and each switching module being connected to the two conducting segments of the same power supply track that are adjacent to the insulated joint at the level of which the switching module is located;
the insulated joints of the two tracks are located at the same level along the power supply line, and the switching modules located at the same level are integrated into a connection assembly; and
the power supply circuit comprises a power supply source which is permanently connected to the power supply line.

BRIEF DESCRIPTION OF THE DRAWING

The invention will be better understood from reading the following description of an embodiment, which is given solely by way of example and with reference to the drawings, in which the single FIGURE is a top view of a ground-level power supply circuit for two running ways in opposite directions to one another.

DETAILED DESCRIPTION OF THE PREFERRED EMBODIMENT

According to the FIGURE, a ground-level power supply circuit, especially for a tramway, comprises two vehicle running ways 2, 4, each of which is equipped with a power supply track 6, 8.

The power supply circuit also comprises on the one hand a power supply line 9, which is common to the two tracks 6, 8 and includes a power supply cable 10 and a current return cable 12, and on the other hand connection assemblies 14 which allow either of the tracks 6, 8 to be connected to the electric cables 10, 12, only one connection assembly being shown in the FIGURE.

The two running ways 2, 4 of the tramway type, which are here in the form of a straight partial path, are arranged on the ground parallel to one another, each having mutually opposite running directions, shown by the arrows 16, 18, respectively.

Each running way 2, 4 includes a pair of parallel running rails 20, 22 and, arranged between the two rails 20, 22 of each pair, the associated ground-level power supply track 6, 8. Each track 6, 8 includes a series of electrically conducting power supply track segments which are separated by insulated joints.

In the FIGURE, each track 6, 8 includes locally an insulated joint 24, 26, represented by the cross-hatching, which is surrounded on each side by first and second conducting track segments 28, 29; 30, 31, represented by the vertical hatching.

Each insulated joint 24, 26 includes first and second insulating track elements 32, 33; 34, 35.

Each conducting track segment 28, 29; 30, 31 includes one or more successive conducting track elements which are connected electrically. In the FIGURE, only one conducting track element is shown for each conducting track segment.

Each conducting track segment 28, 29; 30, 31 rests over its entire length on a support 36, 38; 40, 42 which is made of insulating material and has the general form of an "I"-shaped profile.

For each rail, each insulating track element 32, 33; 34, 36 adjacent to the first conducting segment 28, 30 and to the second conducting segment 29, 31, respectively, rests on the supports 36, 38; 40, 42 associated with the conducting segments 28, 29; 30, 31, respectively.

The power supply line 9 is arranged in parallel between the two running ways 2 and 4 according to a median axis X-X which separates the two ways 2 and 4.

The electric cables 10, 12 are each connected to each conducting segment of the two power supply tracks 6, 8 by means of connection assemblies 14 which are arranged centrally according to the axis X-X at the level of, for example, adjacent to, one insulated joint out of two. In the FIGURE, only one connecting assembly 14 is shown at the level of, for example, adjacent to, the two insulated joints 24, 26.

The connecting assemblies 14 are arranged inside central ports according to the axis X-X, which are arranged above the electric cables 10 and 12.

The two electric cables 10, 12 are connected to the two terminals of a voltage source, the power supply cable 10 and the current return cable 12 being set to a voltage of 750 volts and 0 volts, respectively.

The electric cables 10, 12 are in the form of electric cables that are conventionally known in transport and electrical energy distribution. The cables are each provided with a sleeve and have a cross-section corresponding to a charging current deemed necessary which can vary from 70 to 500 mm$^2$.

The connection assembly 14 includes two switching modules 46, 48 associated with the two supply tracks 6, 8, respectively.

Each switching module 46, 48 is connected to the power supply cable 10 and to the current return cable 12 at two line inputs 50, 52; 54, 56.

Each switching module 46, 48 includes two track outputs 58, 60; 62, 64, a first 58, 62 being connected to the first conducting track segment 28, 30, adjacent to the associated joint 24, 26, and a second 60, 64 being connected to the second conducting segment 29, 31, adjacent to the associated joint 24, 26.

Each switching module 46, 48 includes two switching command inputs 66, 68; 70, 72, a first command input 66, 70 being connected at a terminal of a first magnetic detection loop 67, 71 associated with the first conducting track segment 28, 30, and a second command input 68, 72 being connected at a terminal of a second magnetic detection loop 69, 73 associated with the second conducting track segment 29, 31.

Each switching module 46, 48 includes two switches 74, 76; 78, 80. A first switch 74, 78 is suitable for selectively connecting the first track output 58, 62 to the first line input 50, 54 or to the second line input 52, 56 as a function of the command supplied at the first command input 66, 70. A second switch 76, 80 is suitable for selectively connecting the second track output 60, 64 to the first line input 50, 54 or to the second line input 52, 56 as a function of the command supplied at the second command input 68, 72.

During operation, when a vehicle of the tramway type is moving in the direction of travel 16 along the running rail 20 and comes to be located at the input above the conducting track segment 29, the corresponding magnetic detection loop 69 located beneath the vehicle detects the presence thereof and sends a command signal to the switch 76 for supplying the conducting track segment 29.

When the switch 76 has received the command to supply power to the track segment 29, the switch connects the power supply output 60 from the input 52 connected to the current return cable 12 to the input 50 connected to the power supply cable 10.

The conducting track segment 29 is thus supplied with current at 750 volts.

At the same time or subsequently, the magnetic detection loop 67 detects that the vehicle has left the track segment 28 and orders the switch 74 to cut off the supply of power to the track segment 28 by switching its output 58 from the input 50 under 750 volts to the input 52 under 0 volts.

The uniqueness of the electric line 9 common to the two power supply tracks 6, 8 may advantageously make it possible to apply the same voltage to the two power supply tracks at the same geographical level, for example, adjacent to one another, and to avoid placing separate supply lines, which would each supply one track while being connected to the same supply source, at equipotential.

The provision of one power supply line and one electric current return line common to the two running rails therefore may make it possible to avoid the provision of ports and sleeves specific to the placing at equipotential of at least two power supply lines.

Furthermore, the arrangement of a power supply line outside the track, in particular the support segments, may permit the easy installation of power supply cables housed in sleeves of large size between the two adjacent rails.

The external arrangement of the power supply and current return cables also may allow easier access for the maintenance of equipment.

By way of variation, each switching module may include a single switch.

In that case, a simple two input-one output switch may be located at the level of, for example, adjacent to each joint of a track while being connected to a track segment.

Accordingly, each conducting track segment may be supplied with power selectively.

By way of variation, each connection assembly may includes a single switching module and each switching module may include two switches. In that case, each switching module connected to the same track is located at the level of, for example, adjacent to, one joint out of two along the same track, the two switches forming the switching module being connected to the two conducting track segments adjacent to that joint at the level of which the switching module is located.

Accordingly, the connection assemblies may alternatively be connected along the power supply line to one of the two power supply tracks.

Accordingly, each conducting segment of the track may be supplied selectively with power and the number of connection assembly installations may be reduced compared with the number of installations necessary when a switching module having a simple switch is located at the level of, for example, adjacent, each joint.

What is claimed is:

1. A ground-level power supply circuit for a transport vehicle comprising:

first and second mutually parallel vehicle running ways, each first and second running way including a power supply track, each power supply track including a series of conducting track segments separated by insulated joints;

a power supply line connectable to terminals of a power supply source, the power supply line being common to the power supply tracks; and switching devices for independently and selectively connecting each power supply track segment to the common power supply line.

2. The power supply circuit according to claim 1, wherein the common power supply line is arranged between the two power supply tracks.

3. The power supply circuit according to claim 1, wherein the common power supply line includes a power supply cable and a current return cable.

4. The power supply circuit according to claim 3, wherein the power supply cable and the current return cable each include electric cables encased in a sleeve.

5. The power supply circuit according to claim 1, wherein the switching devices include a plurality of switches having two inputs and one output, each switch being located adjacent to one of the insulated joints of a track and being connected to a conducting segment of the track.

6. The power supply circuit according to claim 5, wherein the insulated joints of the two tracks are located adjacently along the power supply line, and the switches located adjacent to the insulated joints of the two tracks are integrated into a connection assembly.

7. The power supply circuit according to claim 1, wherein the switching devices include an assembly of switching modules, the switching modules each including two, two input-one output switches and being located only adjacent to one insulated joint out of two along a track, and each switching module being connected to the two conducting segments of the same supply track that are adjacent to that insulated joint.

8. The power supply circuit according to claim 7, wherein the insulated joints of the two tracks are located adjacently along the power supply line, and the switching modules located adjacent to the insulated joints of the two tracks are integrated into a connection assembly.

9. The power supply circuit according to claim 1, further comprising a power supply source permanently connected to the power supply line.

10. The power supply circuit according to claim 1, wherein the transport vehicle is a tramway vehicle.

* * * * *